United States Patent
Kim et al.

(10) Patent No.: US 11,164,558 B2
(45) Date of Patent: Nov. 2, 2021

(54) VEHICULAR AIR CONDITIONING SYSTEM

(71) Applicant: Hanon Systems, Daejeon (KR)

(72) Inventors: Jung Seon Kim, Daejeon (KR); Sang Ho Oh, Daejeon (KR); Tae Wan Kim, Daejeon (KR); Young Duk Park, Daejeon (KR); Jeong Hun Seo, Daejeon (KR); Jeong Eun Lee, Daejeon (KR); Joong Heum Jung, Daejeon (KR); Sun Joo Hong, Daejeon (KR); Jae Hwan Jung, Daejeon (KR); Bok Sun Kang, Daejeon (KR)

(73) Assignee: Hanon Systems, Daejeon (KR)

( * ) Notice: Subject to any disclaimer, the term of this patent is extended or adjusted under 35 U.S.C. 154(b) by 237 days.

(21) Appl. No.: 16/077,891

(22) PCT Filed: Sep. 21, 2017

(86) PCT No.: PCT/KR2017/010369
§ 371 (c)(1),
(2) Date: Aug. 14, 2018

(87) PCT Pub. No.: WO2018/056711
PCT Pub. Date: Mar. 29, 2018

(65) Prior Publication Data
US 2021/0065674 A1    Mar. 4, 2021

(30) Foreign Application Priority Data

Sep. 21, 2016 (KR) .................. 10-2016-0120599
Jan. 4, 2017   (KR) .................. 10-2017-0001146

(Continued)

(51) Int. Cl.
*G10K 11/178* (2006.01)
*B60H 1/32* (2006.01)

(52) U.S. Cl.
CPC ..... *G10K 11/17873* (2018.01); *B60H 1/3229* (2013.01); *B60H 2001/3241* (2013.01); *G10K 2210/1282* (2013.01)

(58) Field of Classification Search
CPC ....... G10K 11/17873; G10K 2210/112; G10K 2210/1282; B60H 1/3229; B60H 2001/3241

(Continued)

(56) References Cited

U.S. PATENT DOCUMENTS 4,591,020 A * 5/1986 Hruby, Jr. ............ H04R 1/2888
                                                                 181/145
8,855,329 B2   10/2014 Slapak et al.

(Continued)

FOREIGN PATENT DOCUMENTS

JP   WO2016/208330    *  5/2016
KR   20-0111191 B1   10/1997

(Continued)

*Primary Examiner* — William A Jerez Lora
(74) *Attorney, Agent, or Firm* — Norton Rose Fulbright US LLP; James R. Crawford

(57) ABSTRACT

A vehicular air conditioning system includes an air conditioner case, a blower configured to blow an air to an internal air flow path of the air conditioner case, a microphone provided in the internal air flow path on a downstream side of the blower and configured to detect noise, and a speaker configured to output sound waves having a phase opposite to a phase of the noise detected by the microphone.

23 Claims, 18 Drawing Sheets

(30) Foreign Application Priority Data

Apr. 25, 2017 (KR) .......................... 10-2017-0052804
May 19, 2017 (KR) .......................... 10-2017-0062378

(58) Field of Classification Search
USPC .................... 381/71.1, 71.3, 71.4, 71.5, 71.8
See application file for complete search history.

(56) References Cited

U.S. PATENT DOCUMENTS

| | | | |
|---|---|---|---|
| 2003/0226712 A1* | 12/2003 | Nishikawa | H04R 1/025 |
| | | | 181/199 |
| 2010/0028134 A1* | 2/2010 | Slapak | G10K 11/17873 |
| | | | 415/119 |
| 2016/0263965 A1 | 9/2016 | Jung et al. | |
| 2019/0147846 A1* | 5/2019 | Schlapfer | G10K 11/17857 |
| | | | 381/71.1 |

FOREIGN PATENT DOCUMENTS

| | | |
|---|---|---|
| KR | 10-0296569 B1 | 5/2001 |
| KR | 20110115522 A | 10/2011 |

* cited by examiner

12
VEHICULAR AIR CONDITIONING SYSTEM

CROSS-REFERENCE TO RELATED PATENT APPLICATIONS

This application is a § 371 of International Application No. PCT/KR2017/010369 filed Sep. 21, 2017, which claims priority of Korean Patent Application Nos. 10-2016-0120599 filed Sep. 21, 2016, 10-2017-0001146 filed Jan. 4, 2017, 10-2017-0052804 filed Apr. 25, 2017 and 10-2017-0062378 filed May 19, 2017. The disclosures of the above patent applications are hereby incorporated herein by reference in their entirety.

TECHNICAL FIELD

The present invention relates to a vehicular air conditioning system and, more particularly, to an air conditioning system which can improves the installation structure of a speaker and a microphone of an ANC device for reducing air conditioner noise, thereby enhancing the efficiency of attenuation of air conditioner noise transmitted from an air conditioner case to a passenger compartment and consequently improving ride comfort in a passenger compartment.

BACKGROUND ART

Noise may be the biggest cause of lowering the ride comfort of a vehicle, There are various types of vehicle noise, including air conditioner noise.

The air conditioner noise includes vibration and noise generated from an air conditioner compressor, vibration and noise generated from a high-pressure refrigerant pipe, and vibration and noise generated from a blower of an air conditioner case. Such vibration and noise may significantly reduce the ride comfort of a vehicle when they are transmitted to a passenger compartment.

Particularly, the noise and vibration of an air conditioner are directly transmitted to the passenger compartment through an air conditioner case and individual discharge vents of the air conditioner case. A passenger in the passenger compartment may experience severe stress and fatigue due to the noise and vibration transmitted in this way. This may not only deteriorate the ride comfort of a vehicle, but also may affect the safe driving of a driver.

Therefore, it is necessary to reduce the air conditioner noise in order to improve the ride comfort and assure the safe driving.

As a method for reducing air conditioner noise, there is available an ANC (Active Noise Control) technique which outputs a sound wave having a waveform opposite to the air conditioner noise through a speaker to cancel the air conditioner noise.

In this technique, as shown in FIG. 1, a microphone 3 and a speaker 5 are provided in an air conditioner case 1 to acquire air conditioner noise through the microphone 3 and then output a sound wave having a waveform opposite to the air conditioner noise through the speaker 5. As a result, the air conditioner noise is canceled and reduced.

Normally, the speaker 5 is installed on one side of the air conditioner case 1 corresponding to a portion between a cooling heat exchanger 6 and a heating heat exchanger 7.

However, such a conventional ANC technique has a drawback that the single speaker 5 provided on one side of the air conditioner case 1 cannot output a sufficient amount of sound waves to an internal air flow path 1a of the air conditioner case 1. This may deteriorate the noise reduction efficiency of the air conditioner.

Particularly, when the size of the air conditioner case 1 is large and the cross-sectional area of the internal air flow path 1a of the air conditioner case 1 is large, the sound waves of the speaker 5 provided on one side of the air conditioner case 1 cannot affect the other side of the air conditioner case 1.

Thus, it is impossible to attenuate the air conditioner noise transmitted through the other side of the air conditioner case 1. This may deteriorate the noise reduction efficiency of the air conditioning system.

The emission amount of sound waves may be increased by providing a speaker 5 with a large output. However, in this case, the size of the speaker 5 grows larger, which makes it difficult to install the speaker 5 in the narrow air conditioner case 1.

In the conventional ANC technique, the speaker 5 is installed on one side of the air conditioner case 1. Thus, it is impossible to cope with a case where the internal air flow path 1a of the air conditioner case 1 is bisected by a separation wall 8 for independent control of temperatures of a driver's seat and a passenger's seat as shown in FIG. 2.

Particularly, when the speaker 5 is installed in the driver's seat side internal air flow path 1b of the internal air flow path 1a of the air conditioner case 1, the sound waves outputted from the speaker 5 cannot reach the passenger's seat side internal air flow path 1c beyond the separation wall 8.

For that reason, it is impossible to attenuate the air conditioner noise transmitted through the passenger's seat side internal air flow path 1c. This may deteriorate the noise reduction efficiency of the air conditioning system.

As shown in FIG. 3, in the conventional ANC technique, the speaker 5 is installed in the internal air flow path 1a between the cooling heat exchanger 6 and the heating heat exchanger 7. Therefore, the noise of the air passing through the cooling heat exchanger 6 can be attenuated, but the noise of the air passing through the heating heat exchanger 7 cannot be attenuated.

Particularly, in the warm mode, most of the air passes through the heating heat exchanger 7, which is a resistant body, thereby generating noise. However, it is impossible to attenuate the noise thus generated on side of the heating heat exchanger 7. Thus, the noise generated from the heating heat exchanger 7 is directly transmitted to the passenger compartment.

In addition, the conventional ANC technique has an open structure in which the rear portion of the speaker 5 is opened as shown in FIG. 4. Therefore, the sound waves outputted from the front and rear portions of the speaker 5 undergo cancellation and interference, whereby the sound waves outputted from the speaker 5 are dispersed.

For that reason, it is impossible to output high-quality sound waves and to precisely control sound waves. The low-tone characteristics are low. As a result, the efficiency of attenuation of air conditioner noise is sharply deteriorated.

In view of this, an enclosure housing 8 may be provided at the rear periphery of the speaker 5.

The enclosure housing 8 blocks the rear portion of the speaker 5 from the surroundings to form a speaker chamber having a closed structure. The enclosure housing 8 prevents cancellation and interference of the sound waves generated in the front and rear portions of the speaker 5 so that high-quality sound waves can be outputted, and prevents dispersion of the sound waves outputted from the speaker 5 so that the sound waves can be precisely controlled.

Further, by allowing the speaker chamber to serve as a sound box, the sound waves of the speaker 5 can be amplified so as to enhance the low-tone characteristics.

However, it is very difficult to install the enclosure housing 8 due to the existence of the air conditioner case 1 and various peripheral components 9.

Particularly, a speaker chamber of a sufficient capacity is required in order to obtain sound waves of the optimum output necessary for attenuating the air conditioner noise. In the conventional air conditioning system, a large number of components 9 are installed in the peripheral portion of the air conditioner case 1 in which the enclosure housing 8 is to be installed. Thus, the installation space of the enclosure housing 8 is very narrow. This makes it impossible to install the enclosure housing 8. Even if the enclosure housing 8 is installed, it is difficult to secure a speaker chamber having a sufficient volume.

For that reason, the speaker 5 cannot be controlled by the sound waves of a desired output owing to such a problem. This may reduce the efficiency of attenuation of the air conditioner noise.

In addition, the conventional ANC technique has a structure in which the speaker 5 is directly mounted on the outer surface portion of the air conditioner case 1. Therefore, the vibration generated in the sound wave output process of the speaker 5 is transmitted to the air conditioner case 1. This may increase the air conditioner noise.

Particularly, resonance is generated when the vibration of the speaker 5 is transmitted to the air conditioner case 1. This resonance amplifies the vibration of the speaker 5, thereby increasing the air conditioner noise.

SUMMARY OF THE INVENTION

In view of the aforementioned problems inherent in the related art, it is an object of the present invention to provide a vehicular air conditioning system capable of outputting a sufficient amount of sound waves to an internal air flow path of an air conditioner case without having to use a speaker of a large size.

Another object of the present invention is to provide a vehicular air conditioning system capable of uniformly attenuating air conditioner noise transmitted along an internal air flow path of an air conditioner case without limiting the installation of a speaker.

A further object of the present invention is to provide a vehicular air conditioning system capable of enhancing the effect of reduction of air conditioner noise and consequently improving the ride comfort in a passenger compartment.

A further object of the present invention is to provide a vehicular air conditioning system capable of improving the installation position and number of speakers and consequently outputting a sufficient amount of sound waves to a driver's seat side internal air flow path and a passenger's seat side internal air flow path existing on both sides of a separation wall.

A further object of the present invention is to provide a vehicular air conditioning system capable of efficiently attenuating air conditioner noise transmitted along a driver's seat side internal air flow path and a passenger's seat side internal air flow path and consequently enhancing the effect of reduction of air conditioner noise.

A further object of the present invention is to provide a vehicular air conditioning system capable of improving the installation position of a speaker and consequently attenuating the noise passing through a cooling heat exchanger and a heating heat exchanger.

A further object of the present invention is to provide a vehicular air conditioning system capable of enhancing the effect of reduction of air conditioner noise and consequently improving the ride comfort in a passenger compartment by attenuating the noise passing through a cooling heat exchanger and a heating heat exchanger.

A further object of the present invention is to provide a vehicular air conditioning system capable of improving a structure of an enclosure housing of a speaker and consequently securing a speaker chamber having a sufficient volume even in a narrow installation space.

A further object of the present invention is to provide a vehicular air conditioning system capable of outputting sound waves necessary for attenuating air conditioner noise and consequently improving the performance of attenuation of air conditioner noise.

A further object of the present invention is to provide a vehicular air conditioning system capable of preventing the vibration generated in a sound wave output process from being transmitted to an air conditioner case.

A further object of the present invention is to provide a vehicular air conditioning system capable of preventing the resonance of an air conditioner case due to the vibration of a speaker and preventing the resultant generation of air conditioner noise.

In order to achieve the above objects, there is provided a vehicular air conditioning system, including: an air conditioner case; a blower configured to blow an air to an internal air flow path of the air conditioner case; a microphone provided in the internal air flow path on a downstream side of the blower and configured to detect noise; and a speaker configured to output sound waves having a phase opposite to a phase of the noise detected by the microphone.

The microphone and the speaker may be installed in a section of the internal air flow path where an air flow is linear.

The vehicular air conditioning system may further include: a cooling heat exchanger configured to cool the air blown into the internal air flow path; a heating heat exchanger configured to heat the air blown into the internal air flow path; and a plurality of air discharge vents configured to discharge the air passed through the cooling heat exchanger and the heating heat exchanger to a passenger compartment, wherein the microphone may be installed between the blower and the cooling heat exchanger in the internal air flow path of the air conditioner case, and the speaker may be installed at a front end of each of the air discharge vents in the internal air flow path of the air conditioner case to output noise-attenuating sound waves to the air discharged into the passenger compartment from each of the air discharge vents.

The speaker may be installed at a front end of each of the air discharge vents and in an air mixing region where the air passed through the cooling heat exchanger and the air passed through the heating heat exchanger are merged.

A through hole for installing the speaker may be formed on an outer surface of the air conditioner case, and the vehicular air conditioning system may further include: a vibration-proof fixing part configured to fixedly install the speaker in the through hole of the air conditioner case and to prevent vibration of the speaker from being transmitted to the air conditioner case.

The vehicular air conditioning system may further include: an enclosure housing configured to isolate a rear portion of the speaker from surroundings so that a speaker chamber having a closed structure is formed on a rear side of the speaker, wherein the enclosure housing may include an interference avoiding groove portion formed on an outer surface thereof, the interference avoiding groove portion depressed in a shape corresponding to a shape of a peripheral component so as to accommodate the peripheral component and avoid interference with the peripheral component.

According to an embodiment of the present invention, the microphone capable of capturing air conditioner noise is installed on the downstream side of the blower. Therefore, it is possible to more effectively capture blower noise that makes up the majority of air conditioner noise, thereby effectively coping with the blower noise.

In addition, the speaker for outputting noise-attenuating sound waves is provided on both sides of the internal air flow path of the air conditioner case. Therefore, it is possible to output a sufficient amount of sound waves to the internal air flow path of the air conditioner case without having to use a speaker having a large size.

In addition, it is possible to uniformly attenuate the air conditioner noise transmitted along the internal air flow path of the air conditioner case without limiting the installation of a speaker.

Thus, it is possible to enhance the efficiency of reduction of air conditioner noise and to improve the ride comfort in the passenger compartment.

In addition, the speakers for outputting sound-attenuating sound waves are provided on both sides of the internal air flow path of the air conditioner case, one of which is provided in the driver's seat side internal air flow path and the other of which is provided in the passenger's seat side internal air flow path. Therefore, even if the driver's seat side internal air flow path and the passenger's seat side internal air flow path are bisected by the separation wall, it is possible to output a sufficient amount of sound waves to both the driver's seat side internal air flow path and the passenger's seat side internal air flow path on both sides of the separation wall.

Thus, it is possible to efficiently attenuate the air conditioner noise transmitted along the driver's seat side internal air flow path and the passenger's seat internal air flow path, thereby enhancing the air conditioner noise reduction efficiency.

In addition, the speakers for outputting sound-attenuating sound waves are provided on both sides of the internal air flow path of the air conditioner case and installed at the front ends of the respective air discharge vents. Therefore, it is possible to attenuate the noise of the air passing through the cooling heat exchanger and the heating heat exchanger.

Thus, it is possible to enhance the efficiency of reduction of air conditioner noise and to improve the ride comfort in the passenger compartment.

In addition, the speakers for outputting sound-attenuating sound waves are installed at the front ends of the respective air discharge vents. Therefore, it is possible to output sound-attenuating sound waves to the air conditioner noise finally discharged from the respective air discharge vents. This makes it possible to more effectively attenuate various kinds of air flow noise generated when an air flows through the internal air flow path.

In addition, the enclosure housing is provided on the rear side of the speaker. The interference avoiding groove portion is formed in the enclosure housing to avoid interference with peripheral components. The enclosure housing can be expanded along the outer surface of the air conditioner case while maintaining the height as low as possible. Therefore, it is possible to install the enclosure housing in a narrow space and to secure a speaker chamber having a sufficient volume in spite of the narrow installation space.

Thus, it is possible to obtain sound waves having a sufficient output required for attenuating the air conditioner noise, thereby improving the performance of attenuation of the air conditioner noise.

In addition, the vibration-proof fixing part for vibration insulation is installed between the speaker and the air conditioner case. Therefore, it is possible to prevent the vibration generated in the sound wave output process from being transmitted to the air conditioner case.

Thus, it is possible to prevent the resonance of the air conditioner case due to the vibration of the speaker and to prevent the generation of the air conditioner noise due to the resonance.

DETAILED DESCRIPTION

Preferred embodiments of a vehicular air conditioning system according to the present invention will now be described in detail with reference to the accompanying drawings.

Figure 1:
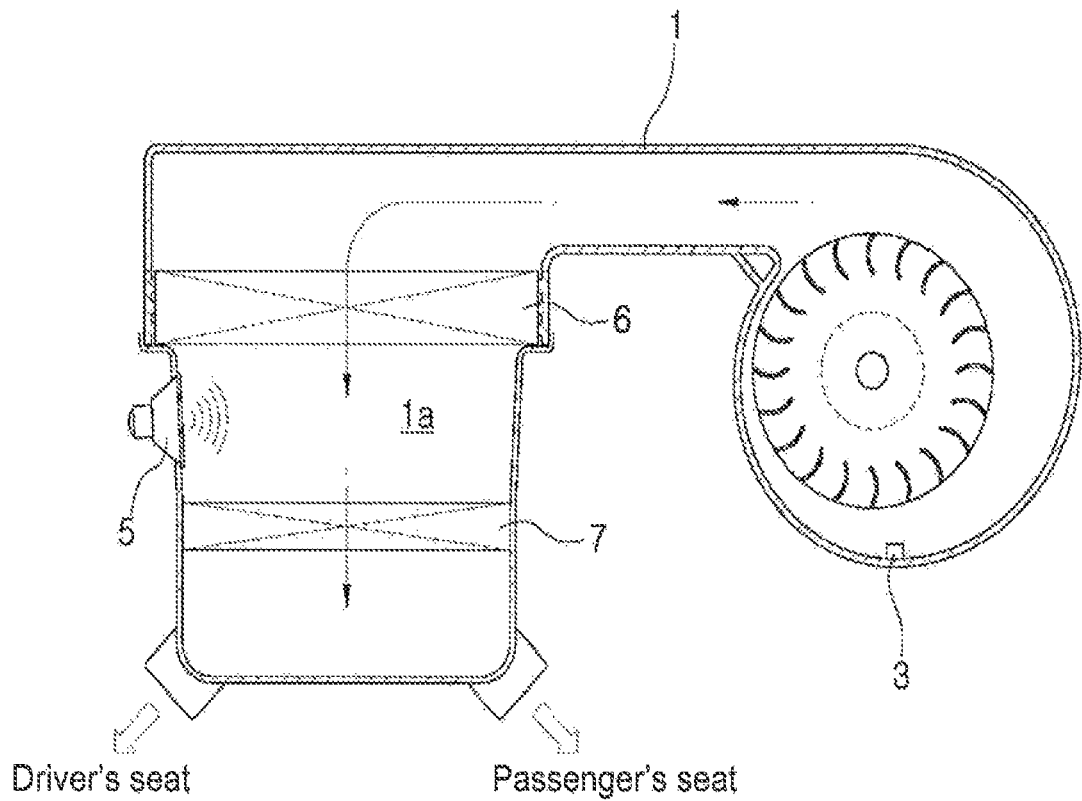
FIG. 1 is a view showing an ANC device installed in a conventional vehicular air conditioning system.
Figure 2:
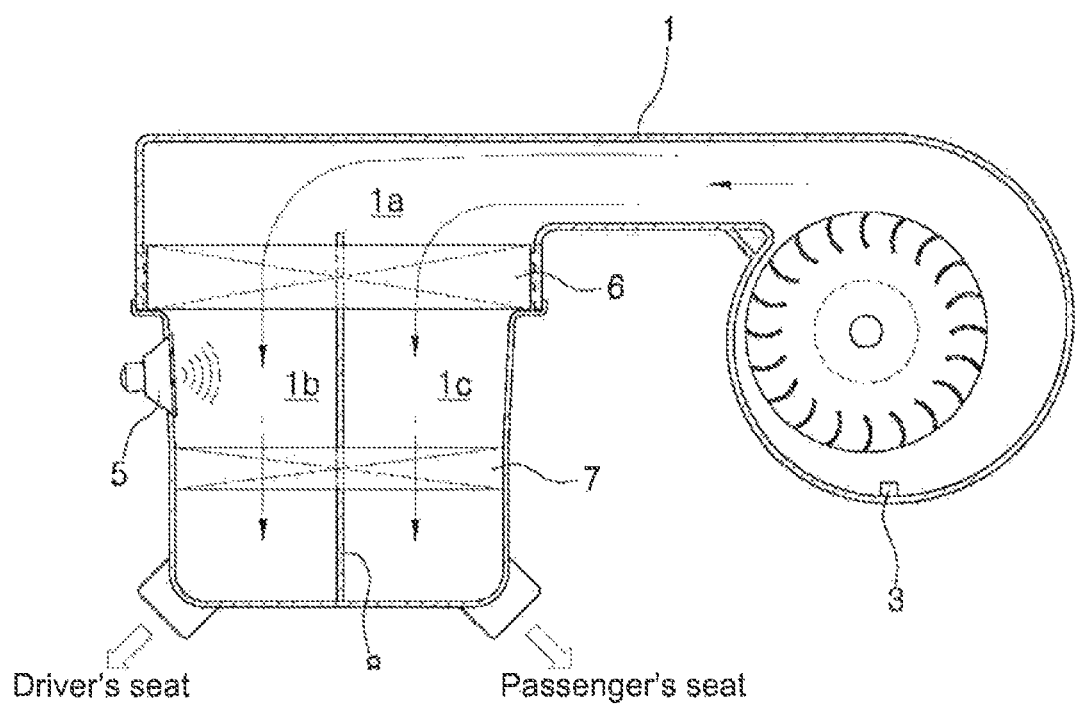
FIG. 2 is a view showing an ANC device of a conventional vehicular air conditioning and showing an example in which an ANC device is applied to an air conditioning system for independent control of temperatures of a driver's seat and a passenger's seat.
Figure 3:
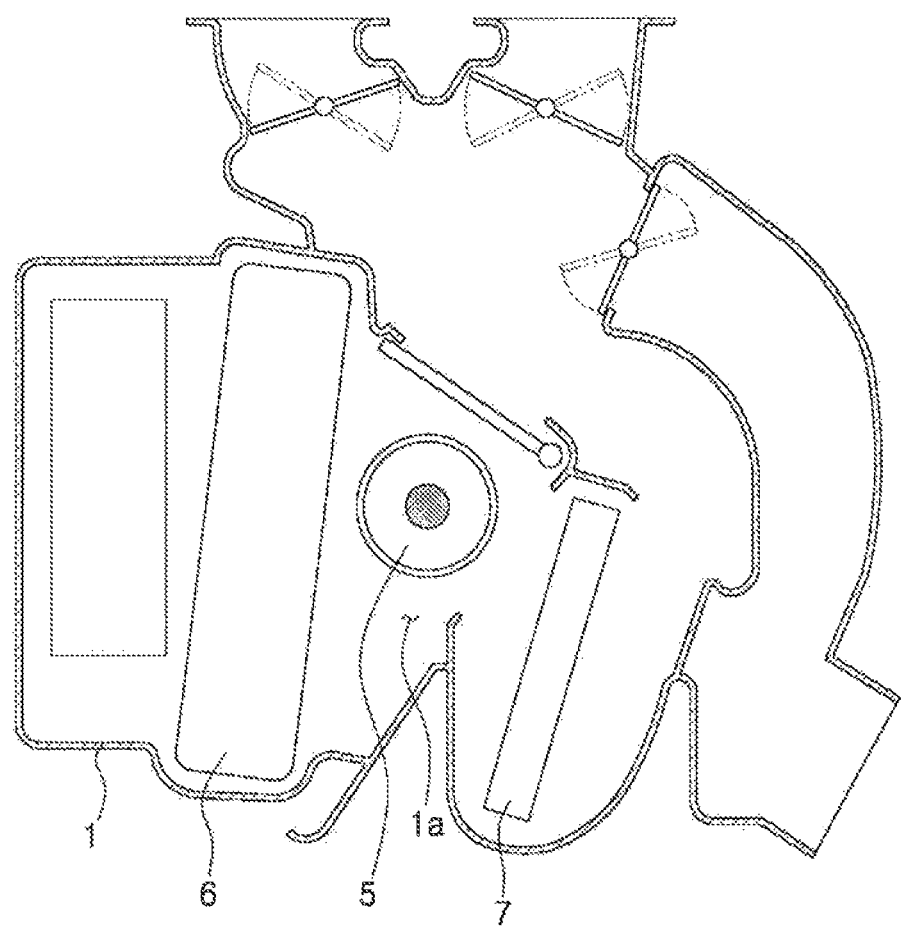
FIG. 3 is a side sectional view showing an ANC device of a conventional vehicular air conditioning system.
Figure 4:
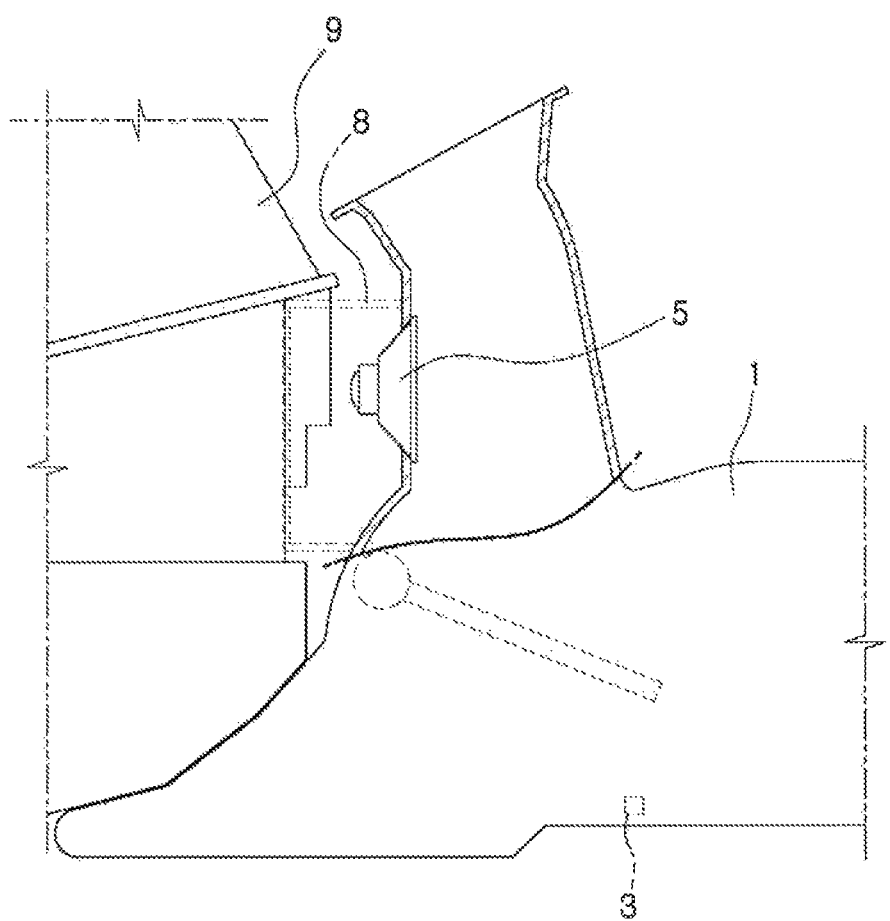
FIG. 4 is a view showing a configuration of another ANC device of a conventional vehicular air conditioning system.
Figure 5:
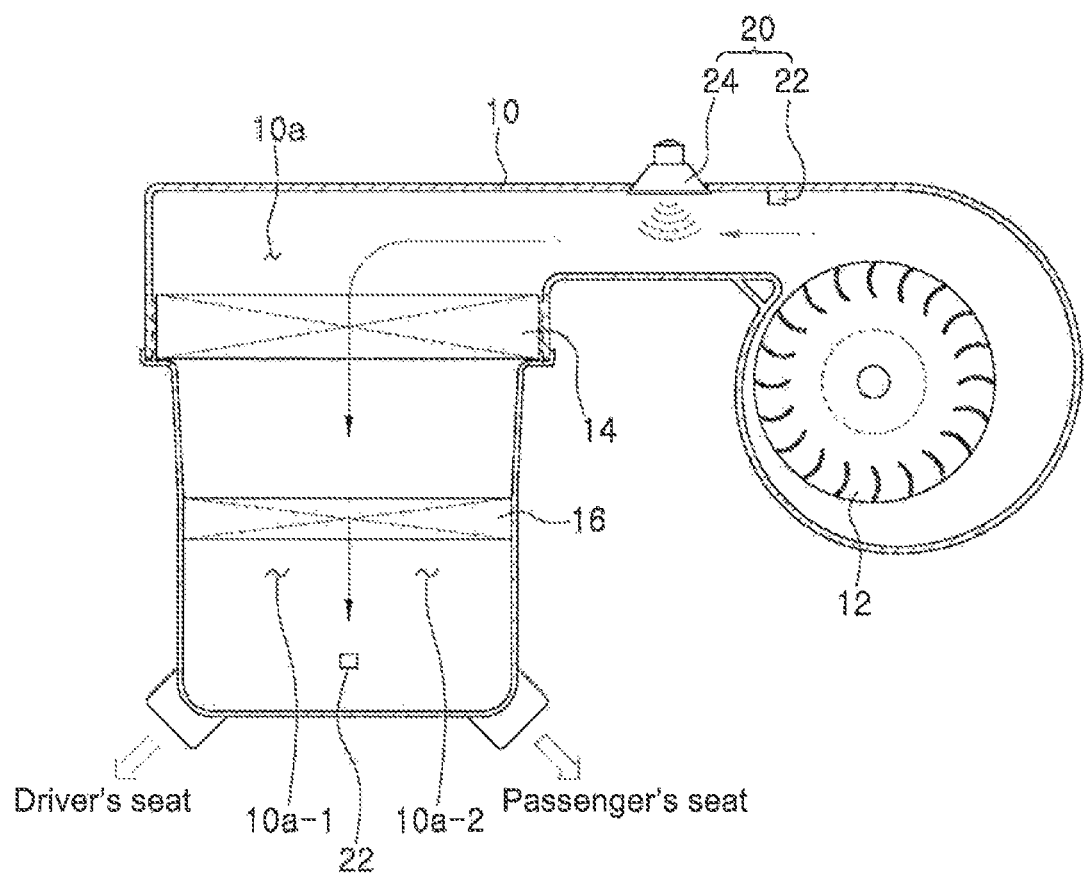
FIG. 5 is a view showing an ANC device of a vehicular air conditioning system according to a first embodiment of the present invention.

A vehicular air conditioning system will be briefly described with reference to FIGS. 5 and 10 prior to describing features of the vehicular air conditioning system according to the present invention.

The vehicular air conditioning system includes an air conditioner case 10. A blower 12, a cooling heat exchanger 14 and a heating heat exchanger 16 are provided in the air conditioner case 10.

The blower 12 sucks internal air or external air and blows the air to an internal air flow path 10a of the air conditioner case 10. The cooling heat exchanger 14 cools the air blown into the internal air flow path 10a. The heating heat exchanger 16 heats the air blown into the internal air flow path 10a.

Figure 10:
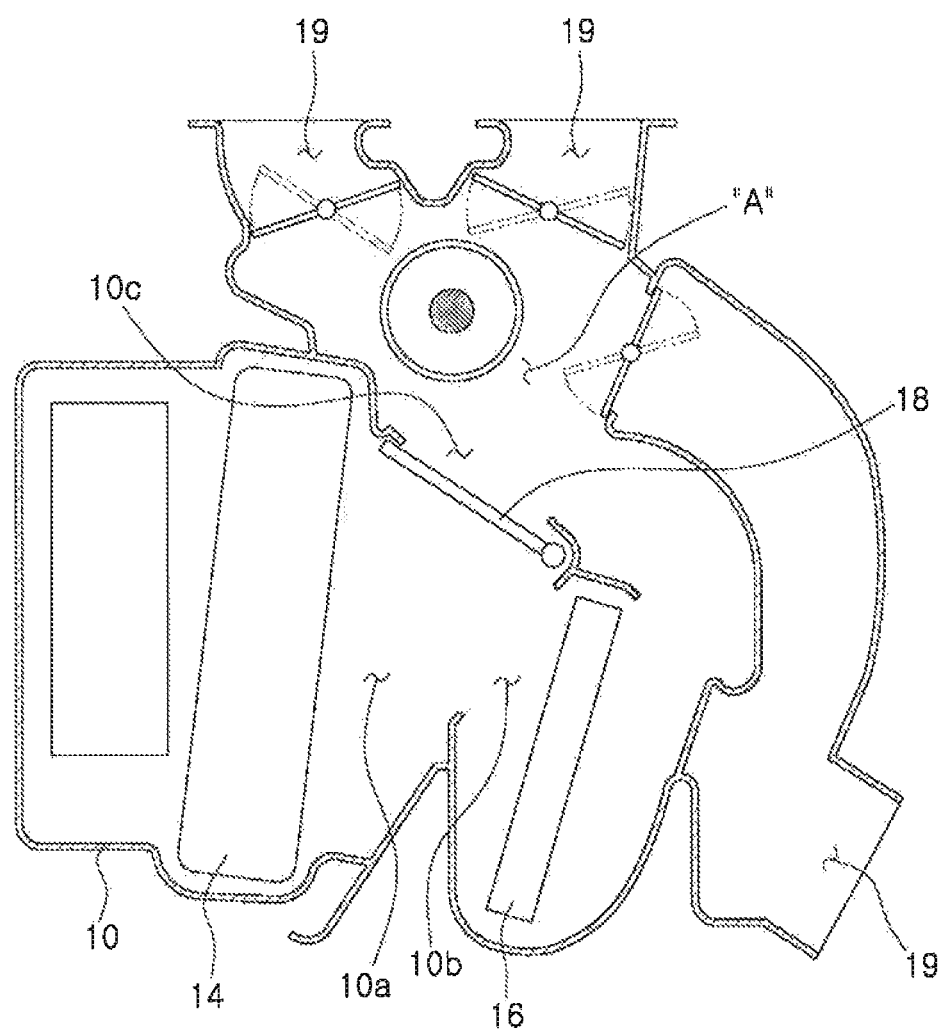
FIG. 10 is a side sectional view showing an ANC device of a vehicular air conditioning system according to a second embodiment of the present invention.

As shown in FIG. 10, the heating heat exchanger 14 is provided in the internal air flow path 10a. The heating heat exchanger 16 is provided in a hot air flow path 10b branched from the internal air flow path 10a. A temperature door 18 is provided at a branching point between the hot air flow path 10b and the cold air flow path 10c.

The cold air cooled by the cooling heat exchanger 14 passes through the cold air flow path 10c. The hot air heated by the heating heat exchanger 16 passes through the hot air flow path 10b. The temperature door 18 rotates between the cold air flow path 10c and the hot air flow path 10b to adjust the opening degree of the cold air flow path 10c or the hot air flow path 10b. Accordingly, the volume of the cold air or the hot air supplied to the passenger compartment is controlled.

The cold air flow path 10c and the hot air flow path 10b are joined together on the downstream side thereof to form an air mixing region A.

The hot air flowing along the hot air flow path 10b and the cold air flowing along the cold air flow path 10c are mixed with each other in the air mixing region A. Accordingly, the hot air and the cold air mixed with each other are supplied to the passenger compartment through the respective air discharge vents 19 while maintaining an appropriate temperature.

First Embodiment

Next, a vehicular air conditioning system according to a first embodiment of the present invention will be described in detail with reference to FIG. 5.

The air conditioning system of the present embodiment includes an ANC (Active Noise Control) device 20 (hereinafter referred to as "noise reduction device") capable of reducing air conditioner noise.

The noise reduction device 20 includes one or more microphones 22 capable of capturing air conditioner noise, and a speaker 24 configured to output sound waves having a waveform opposite to the air conditioner noise based on the air conditioner noise captured by the microphones 22.

The microphone 22 is installed in the internal air flow path 10a of the air conditioner case 10. Particularly, the microphone 22 is installed in a portion between the blower 12 and the cooling heat exchanger 14 in the internal air flow path 10a of the air conditioner case 10.

The thus installed microphone 22 is configured to capture the noise generated in the blower 12. In particular, the microphone 22 is configured to capture the noise of the blower 12, which occupies most of the air conditioner noise.

The speaker 24 is configured to output sound waves having a waveform opposite to the air conditioner noise captured by the microphone 22, thereby canceling the air conditioner noise and consequently reducing the air conditioner noise.

It is preferable that the speaker 24 is provided on the downstream side of the microphone 22. In particular, the speaker 24 is installed in a spaced-apart relationship with the microphone 22 on the downstream side of the microphone 22. The speaker 24 thus installed effectively cancels the air conditioner noise captured by the microphone 22 while immediately responding to the air conditioner noise.

It is preferable that the microphone 22 and the speaker 24 are provided in the section of the internal air flow path 10a of the air conditioner case 10 where the air flows linearly. In order to effectively attenuate the detected noise, it is preferable that the microphone 22 and the speaker 24 are arranged close to each other.

In addition, it is preferable that the microphone 22 and the speaker 24 are provided on the same line along the air flow direction. Needless to say, the microphone 22 and the speaker 24 are spaced apart from each other by a certain distance. That is, the microphone 22 and the speaker 24 are disposed together in the section where the air flow is uniform.

By disposing the microphone 22 and the speaker 24 in the section where the air flow is linear, i.e., at the location where the air flow is uniform, it is possible for the speaker 24 to output sound waves having a frequency capable of cancelling the noise detected by the microphone 22. Therefore, it is possible to further improve the air conditioner noise removal performance.

In particular, it is possible to further improve the noise removal performance by directly outputting the sound waves having a frequency phase opposite to the frequency phase of the noise detected by the microphone 22 through the speaker 24 disposed in the section where the air flow is linear.

Referring again to FIG. 5, the noise reduction device 20 has a structure in which the microphone 22 is further provided in the portion on the side of the air discharge vent.

The air discharge vent side microphone 22 detects the exit noise at the exit of the air conditioner case 10 so that the speaker 24 can be controlled based on the detected noise. In particular, the speaker 24 can be controlled so as to output sound waves of a phase opposite to the phase of the exit noise.

This makes it possible to more effectively reduce the noise generated on the exit side of the air conditioner case 10.

Second Embodiment

Next, a vehicular air conditioning system according to a second embodiment of the present invention will be described in detail with reference to FIGS. 6 to 10.

Figure 6:
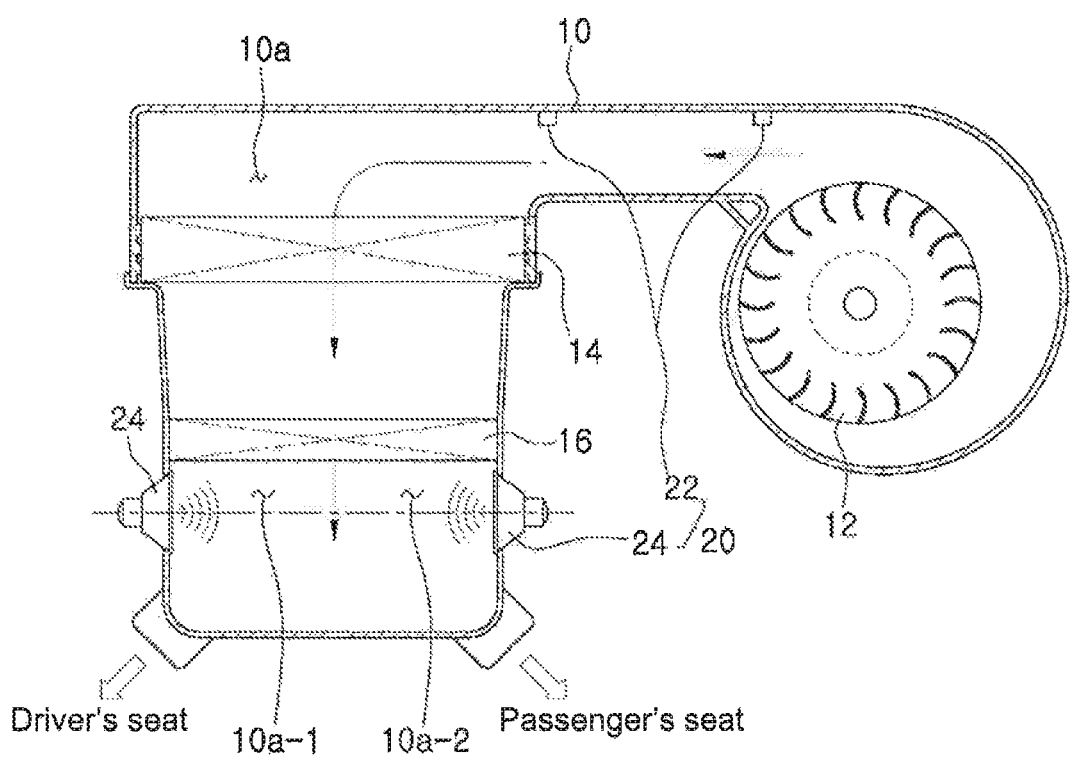
FIG. 6 is a view showing an ANC device of a vehicular air conditioning system according to a second embodiment of the present invention.

Referring first to FIG. 6, the air conditioning system of the present embodiment includes a microphone 22 of a noise reduction device 20. The microphone 22 is installed in an internal air flow path 10a of an air conditioner case 10. Particularly, the microphone 22 is installed in a portion between the blower 12 and the cooling heat exchanger 14 in the internal air flow path 10a of the air conditioner case 10.

The microphone 22 thus installed is configured to capture the noise generated in the blower 12. In particular, the microphone 22 is configured to capture the noise of the blower 12, which occupies most of the air conditioner noise.

Preferably, two microphones 22 are provided at intervals between the blower 12 and the cooling heat exchanger 14.

Particularly, one of the two microphones is disposed on the downstream side of the blower 12, and the other is disposed on the side of the cooling heat exchanger 14.

The reason for adopting this configuration is to make sure that the microphone 22 installed on the downstream side of the blower 12 mainly captures the noise generated by the blower 12 and the microphone 22 installed on the side of the cooling heat exchanger 14 captures the noise of the air flowing through the internal air flow path 10a of the air conditioner case 10 and the noise transmitted to the air conditioner case 10 through a refrigerant pipe.

The two microphones 22 provided at intervals between the blower 12 and the cooling heat exchanger 14 may collectively detect and capture the air conditioner noise generated in the air conditioner case 10.

Referring again to FIG. 6, the noise reduction device 20 includes a plurality of speakers 24 for outputting sound waves having a waveform opposite to the air conditioner noise, based on the air conditioner noise captured by the microphone 22.

The speakers 24 are installed on both sides of the air conditioner case 10. In particular, the speakers 24 are installed on both sides of the air conditioner case 10 across the internal air flow path 10a.

Preferably, one of the speakers 24 is installed in the driver's seat side internal air flow path 10a-1, and the other is installed in the passenger's seat side internal air flow path 10a-2.

These two speakers 24 are configured to output sound waves having a waveform opposite to the air conditioner noise, especially the noise of the blower 12, toward the internal air flow path 10a of the air conditioner case 10.

Accordingly, the noise of the blower 12 transmitted to the passenger compartment along the internal air flow path 10a is attenuated. This reduces the noise of the blower 12 transmitted to the passenger compartment. As a result, the ride comfort in the passenger compartment is improved.

The speakers 24 provided on both sides of the air conditioner case 10 are configured to outputs sound waves from both sides of the internal air flow path 10a.

Therefore, it is possible for the speakers 24 to output a sufficient amount of sound waves to the internal air flow path 10a of the air conditioner case 10.

Particularly, from the viewpoint of the air flow in the internal air flow path 10a, a sufficient amount of sound waves may be outputted to the driver's seat side internal air flow path 10a-1 of the internal air flow path 10a corresponding to the driver's seat side air flow and the passenger's seat side internal air flow path 10a-2 of the internal air flow path 10a corresponding to the passenger's seat side air flow.

Therefore, the sound waves of the speakers 24 may be uniformly propagated to one side portion and the other side portion of the internal air flow path 10a even if the cross-sectional area of the internal air flow path 10a of the air conditioner case 10 is large.

As a result, various kinds of air conditioner noise transmitted along the internal air flow path 10a of the air conditioner case 10 can be uniformly attenuated without any deviation. This makes it possible to enhance the air conditioner noise reduction efficiency, thereby remarkably improving the ride comfort in the passenger compartment.

Figure 7:
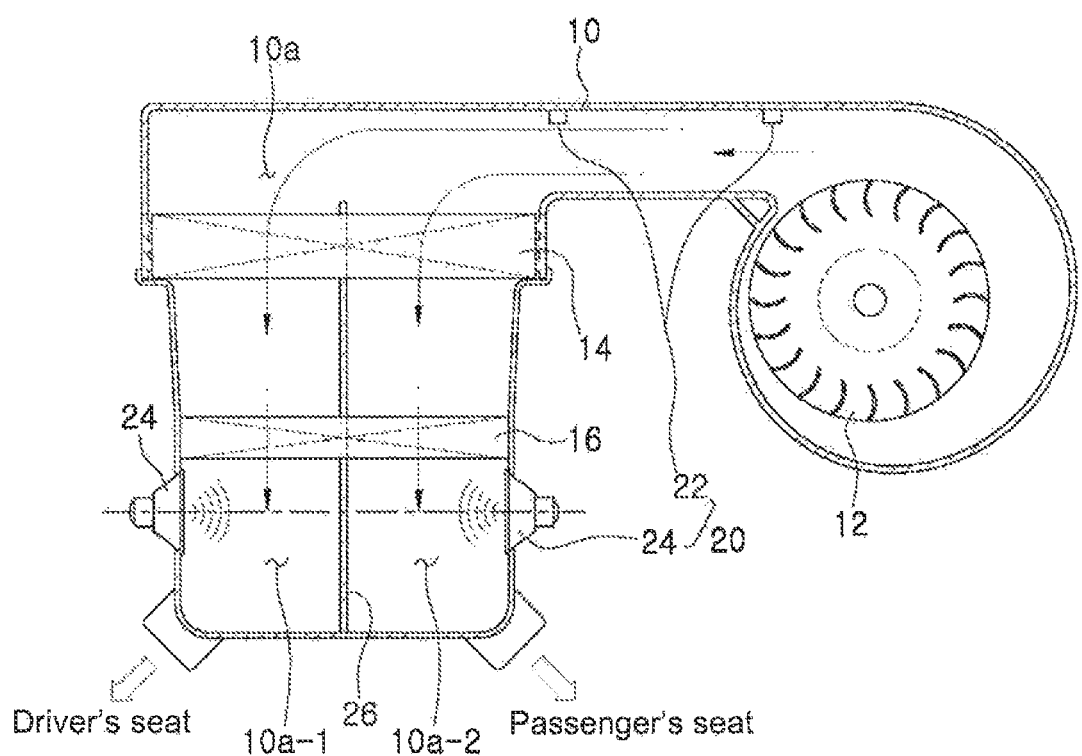
FIG. 7 is a view showing the ANC device of the vehicular air conditioning system according to the second embodiment of the present invention and showing an example in which an ANC device is applied to an air conditioning system for independent control of temperatures of a driver's seat and a passenger's seat.

As shown in FIG. 7, the inner air flow path 10a of the air conditioner case 10 is bisected by the central separation wall 26 into the driver's seat side internal air flow path 10a-1 and the passenger's seat side internal air flow path 10a-2, the speakers 24 installed on both sides of the air conditioner case 10 are disposed in the driver's seat side internal air flow path 10a-1 and the passenger's seat side internal air flow path 10a-2, respectively.

Therefore, sound waves may be independently outputted to the driver's seat side internal air flow path 10a-1 and the passenger's seat side internal air flow path 10a-2, respectively.

Accordingly, it is possible to output a sufficient amount of sound waves to both the driver's seat side internal air flow path 10a-1 and the passenger's seat side internal air flow path 10a-2.

As a result, it is possible to efficiently attenuate the air conditioner noise transmitted along the driver's seat side internal air flow path 10a-1 and the passenger's seat side internal air flow path 10a-2. As a result, it is possible to enhance the noise reduction efficiency of the vehicular air conditioning system.

As shown in FIGS. 6 and 7, the speakers 24 on both sides of the air conditioner case 10 having such a structure are installed to face each other across the internal air flow path 10a in the air conditioner case 10. The speakers 24 have the same central axis.

The reason for adopting this configuration is that when the two speakers 24 have the same central axis, the effect of attenuation of the air conditioner noise is the largest.

Figure 8:
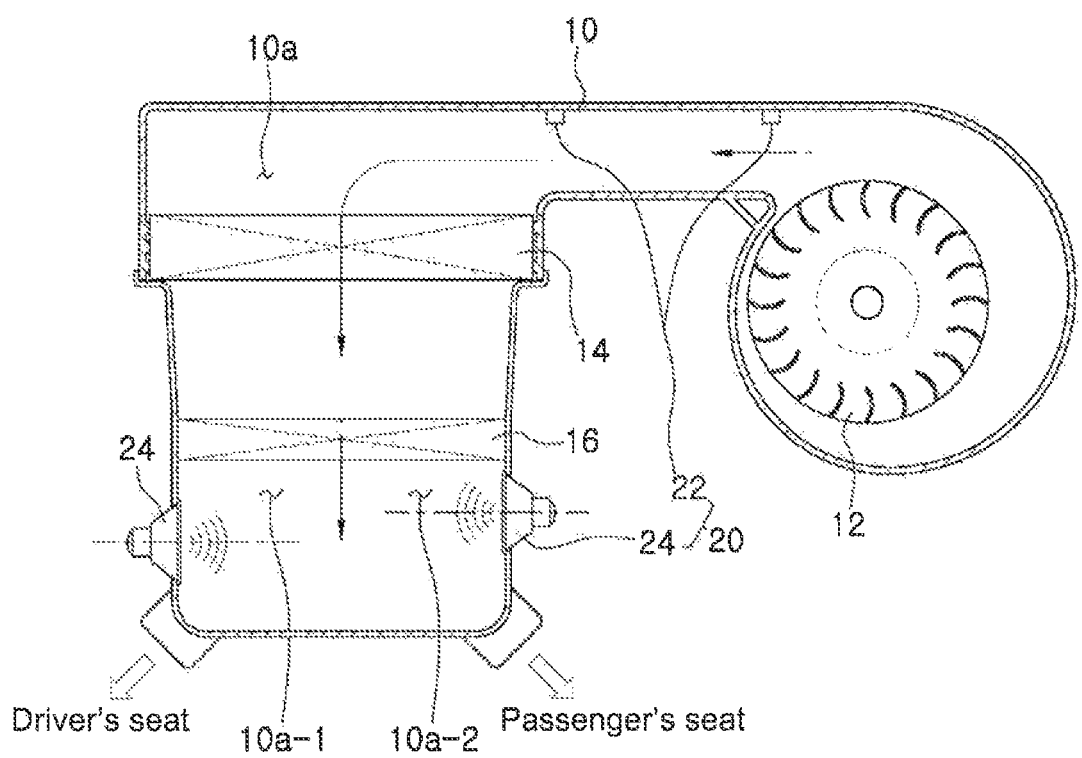
FIG. 8 is a view showing another installation example of the speakers constituting the ANC device of the vehicular air conditioning system according to the second embodiment of the present invention.
Figure 9:
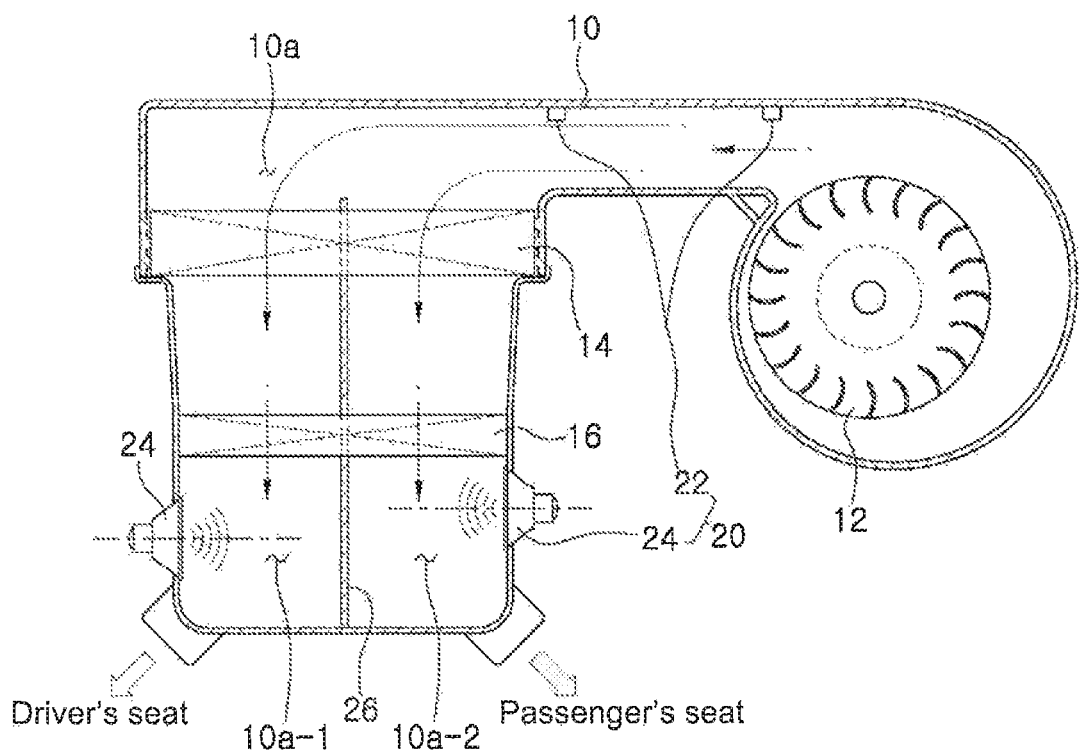
FIG. 9 is a view showing a further installation example of the speakers constituting the ANC device of the vehicular air conditioning system according to the second embodiment of the present invention and showing an example in which an ANC device is applied to an air conditioning system for independent control of temperatures of a driver's seat and a passenger's seat.

As shown in FIGS. 8 and 9, the speakers 24 on both sides of the air conditioner case 10 may be installed so that they have different central axes shifted from each other.

In this case, it is preferable that the two speakers 24 are configured to output sound waves having different waveforms.

Particularly, the speaker 24 relatively close to the air discharge vent 19 may be configured to output sound waves having a waveform opposite to the air conditioner noise captured by the microphone 22, and the speaker 24 relatively distant from the air discharge vent 19 may be configured to output sound waves having a waveform different from that of the sound waves of the speaker 24 close to the air discharge vent 19.

The reason for adopting this configuration is that if the center axes of the speakers 24 are not coincident with each other, the speakers 24 can efficiently attenuate the air conditioner noise by outputting different types of sound waves having a waveform opposite to the air conditioner noise.

The speakers 24 are controlled by a control unit (not shown) so as to output different types of sound waves.

Referring to 10, the speakers 24 are installed in the internal air flow path 10a of the air conditioner case 10 on the downstream side of the cold air flow path 10c and the hot air flow path 10b.

Specifically, the speakers 24 are installed in a region where the air passed through the cooling heat exchanger 14 and the air passed through the heating heat exchanger 16 are merged, for example, in the portion of the air conditioner case 10 corresponding to an air mixing region A on the downstream side of the cold air flow path 10c and the hot air flow path 10b.

The speakers 24 having such a structure may attenuate the noise of the air passing through the cooling heat exchanger 14 and the heating heat exchanger 16.

Particularly, regardless of the cool mode and the warm mode, the speakers 24 may attenuate all types of noise generated when an air passes through the cooling heat exchanger 14 and the heating heat exchanger 16, which are air-resistant bodies. As a result, it is possible to enhance the air conditioner noise reduction efficiency.

Preferably, the speakers 24 are installed on the downstream side of the cold air flow path 10c and the hot air flow path 10b, and are disposed as close to the respective air discharge vents 19 as possible.

The reason for adopting this configuration is to output noise-attenuating sound waves to the air just before being discharged from each air discharge vent 19, thereby reducing the air conditioner noise finally discharged from the air discharge vent 19.

Particularly, various kinds of air flow noise are generated when the air blown from the blower 12 flows along the internal air flow path 10a of the air conditioner case 10. By installing the speakers 24 at the positions close to the air discharge vents 19, it is possible to more effectively attenuate various kinds of air flow noise generated when the air flows through the internal air flow path 10a. As a result, it is possible to enhance the air conditioner noise reduction efficiency.

In the detailed description and the drawings, the two speakers 24 are installed in the internal air flow path 10a at the positions close to the air discharge vents 19 and corresponding to the air mixing region A on the downstream side of the cold air flow path 10c and the hot air flow path 10b. In some cases, a pair of speakers may be provided in each of the internal air flow paths 10a configured to the respective air discharge vents 19.

In this case, it is possible to independently attenuate the air conditioner noise transmitted from the respective air discharge vents 19 to the passenger compartment, thereby enhancing the efficiency of reduction of the air conditioner noise.

According to the air conditioning systems of the first and second embodiments having such configurations, the microphone 22 capable of capturing the air conditioner noise is provided on the downstream side of the blower 12. Therefore, it is possible to effectively capture the noise of the blower 12, which occupies most of the air conditioner noise. This makes it possible to effectively cope with the noise of the blower 12.

According to the air conditioning system of the second embodiment, the speakers 24 for outputting noise-attenuating sound waves are installed on both sides of the internal air flow path 10a of the air conditioner case 10. Therefore, it is possible to output a sufficient amount of sound waves to the internal air flow path 10a of the air conditioner case 10 without having to use speakers having a large size.

Since a sufficient amount of sound waves can be outputted to the internal air flow path 10a of the air conditioner case 10 without having to use speakers having a large size, it is possible to uniformly attenuate the air conditioner noise transmitted along the internal air flow path 10a of the air conditioner case 10 without limiting the installation of the speakers 24.

In addition, since the air conditioner noise transmitted along the internal air flow path 10a of the air conditioner case 10 can be uniformly attenuated without any partial deviation, it is possible to enhance the air conditioner noise reduction efficiency, thereby improving the ride comfort in the passenger compartment.

The two speakers 24 for outputting noise-attenuating sound waves are provided on both sides of the internal air flow path 10a of the air conditioner case 10, one of which is installed in the driver's seat side internal air flow path 10a-1 and the other of which is installed in the passenger's seat side internal air flow path 10a-2. Therefore, even if the driver's seat side internal air flow path 10a-1 and the passenger's seat side internal air flow path 10a-2 are bisected by the separation wall 26, it is possible to output a sufficient amount of sound waves to both the driver's seat side internal air flow path 10a-1 and the passenger's seat side internal air flow path 10a-2.

Since the sufficient amount of sound waves can be outputted to both the driver's seat side internal air flow path 10a-1 and the passenger's seat side internal air flow path 10a-2 on both sides of the separation wall 26, it is possible to efficiently attenuate the air conditioner noise transmitted along the driver's seat side internal air flow path 10a-1 and the passenger's seat side internal air flow path 10a-2, thereby enhancing the air conditioner noise reduction efficiency.

Since the speakers 24 for outputting noise-attenuating sound waves are provided on both sides of the internal air flow path 10a of the air conditioner case 10 at the front ends of the air discharge vents 19, it is possible to attenuate the noise of the air passing through the cooling heat exchanger 14 and the heating heat exchanger 16.

Since the noise of the air passing through the cooling heat exchanger 14 and the heating heat exchanger 16 can be attenuated, it is possible to enhance the air conditioner noise reduction efficiency, thereby improving the ride comfort in the passenger compartment.

Since the speakers 24 for outputting noise-attenuating sound waves are installed at the front ends of the air discharge vents 19, it is possible to output noise-attenuating sound waves to the air conditioner noise finally discharged from the air discharge vents 19, thereby effectively attenuating various types of air flow noise generated when the air flows through the internal air flow path 10a.

Third Embodiment

Next, a vehicular air conditioning system according to a third embodiment of the present invention will be described in detail with reference to FIGS. 11 to 18.

Referring first to FIGS. 11 to 15, the vehicular air conditioning system of the present embodiment invention includes a vibration-proof fixing part 30 for fixing the speaker 24 of the noise reduction device 20 to the air conditioner case 10 and preventing the vibration of the speaker 24 from being transmitted to the air conditioner case 10.

Figure 11:
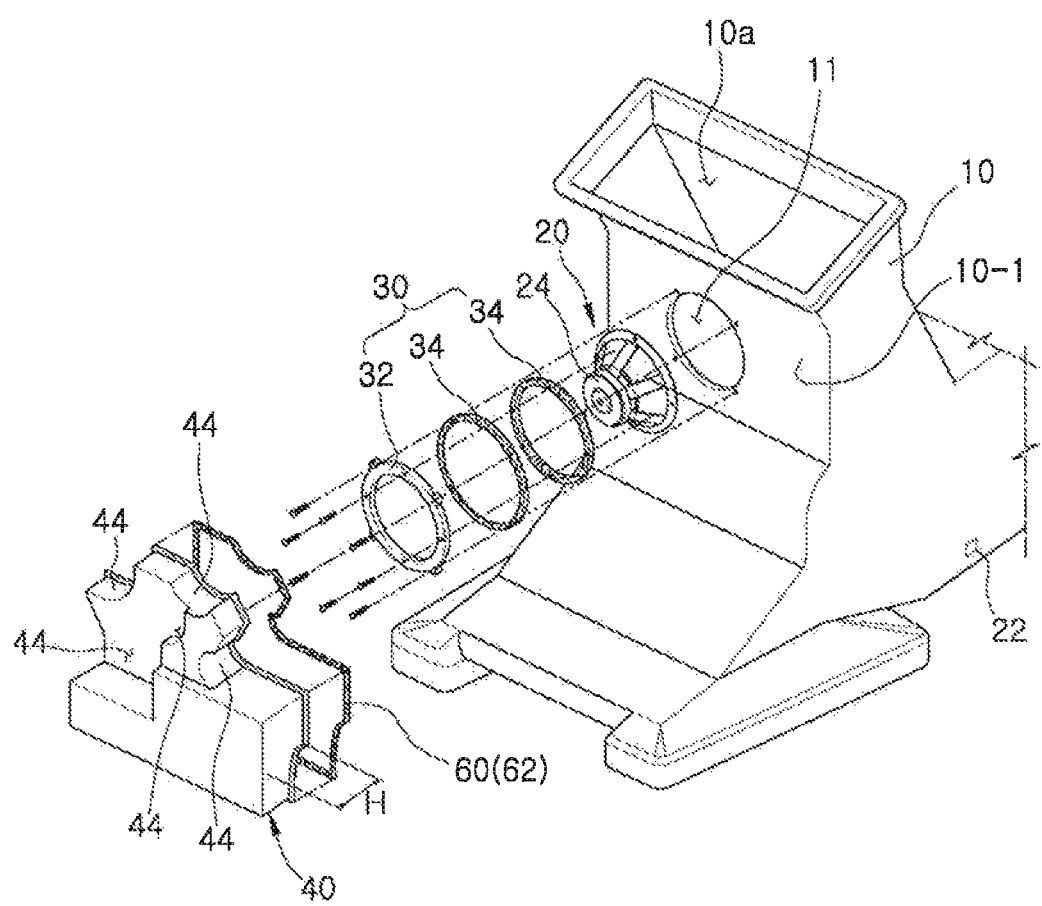
FIG. 11 is an exploded perspective view showing an ANC device of a vehicular air conditioning system according to a third embodiment of the present invention.
Figure 12:
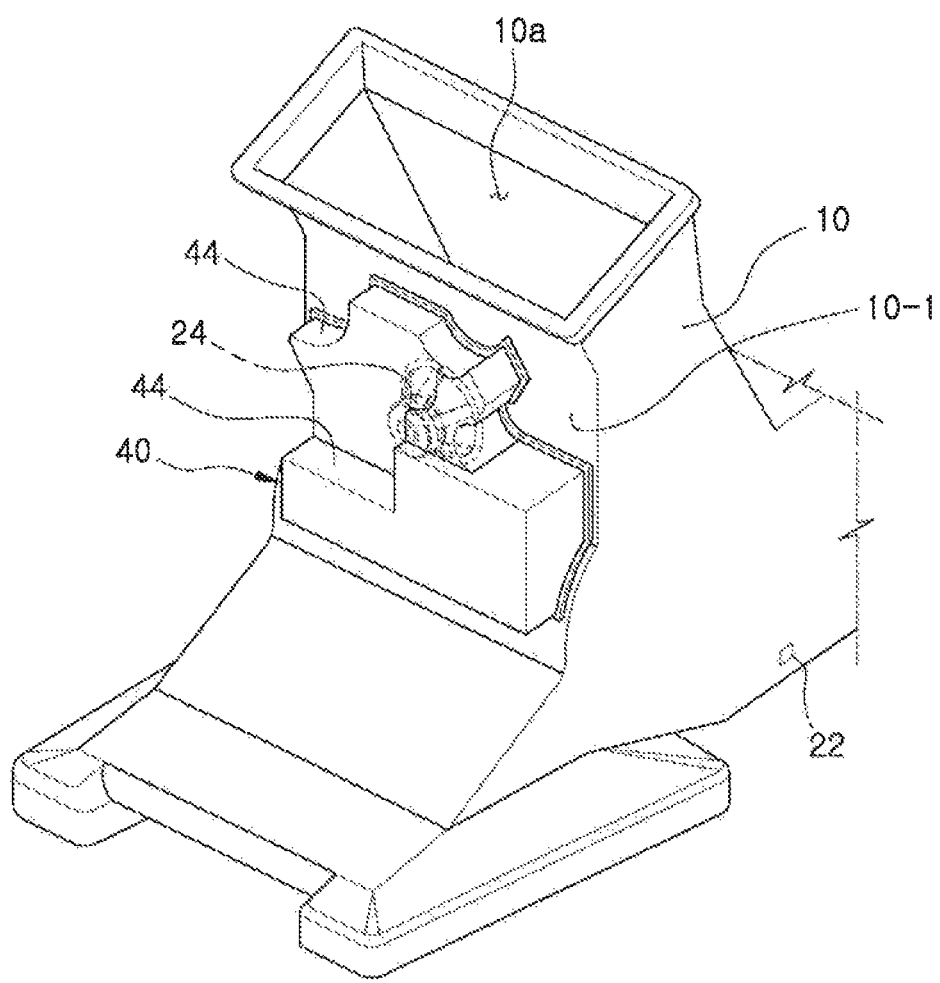
FIG. 12 is a perspective view showing a combined state of the ANC device of the vehicular air conditioning system shown in FIG. 11.
Figure 13:
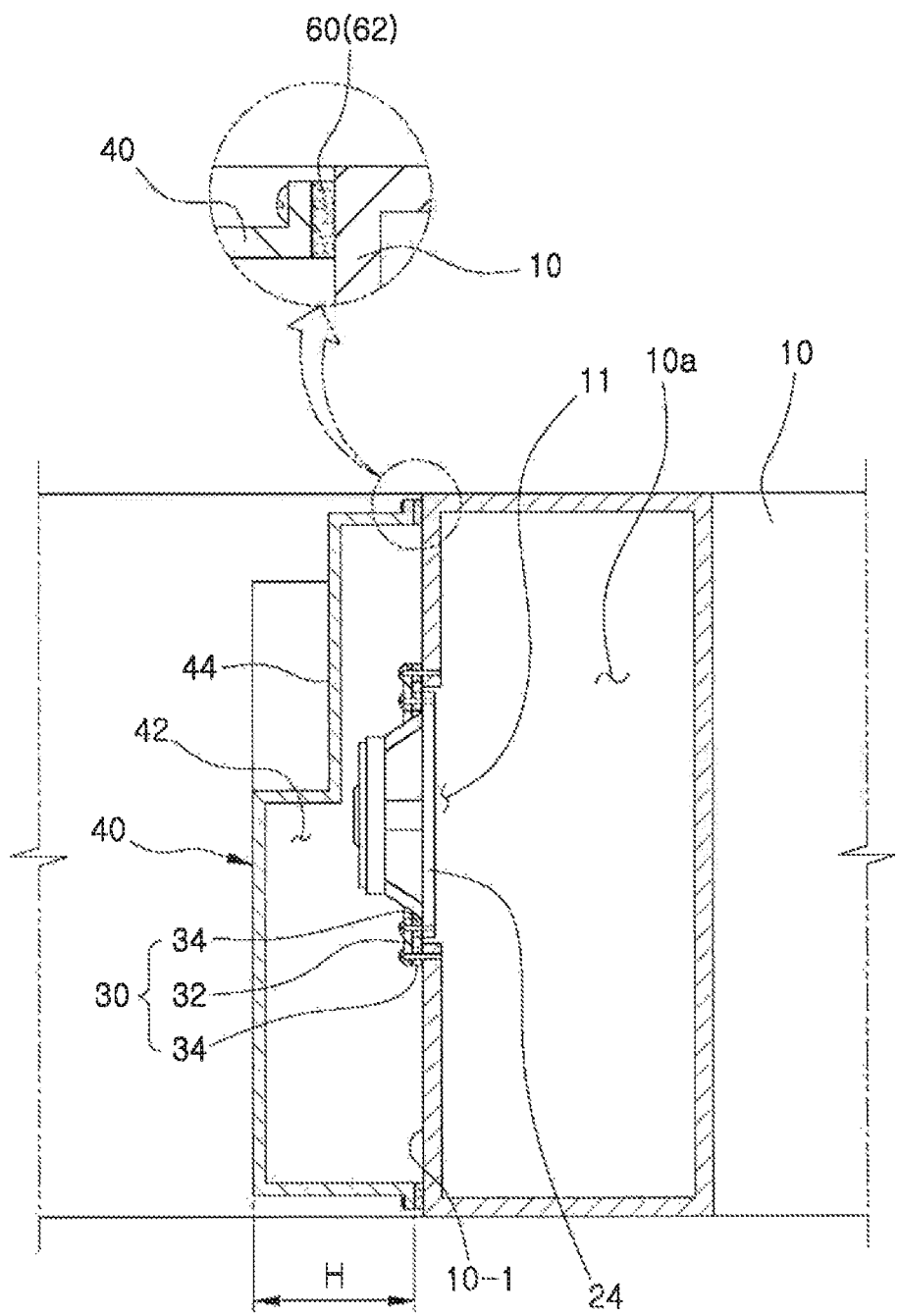
FIG. 13 is a horizontal sectional view of the ANC device of the vehicular air conditioning system shown in FIG. 12.
Figure 14:
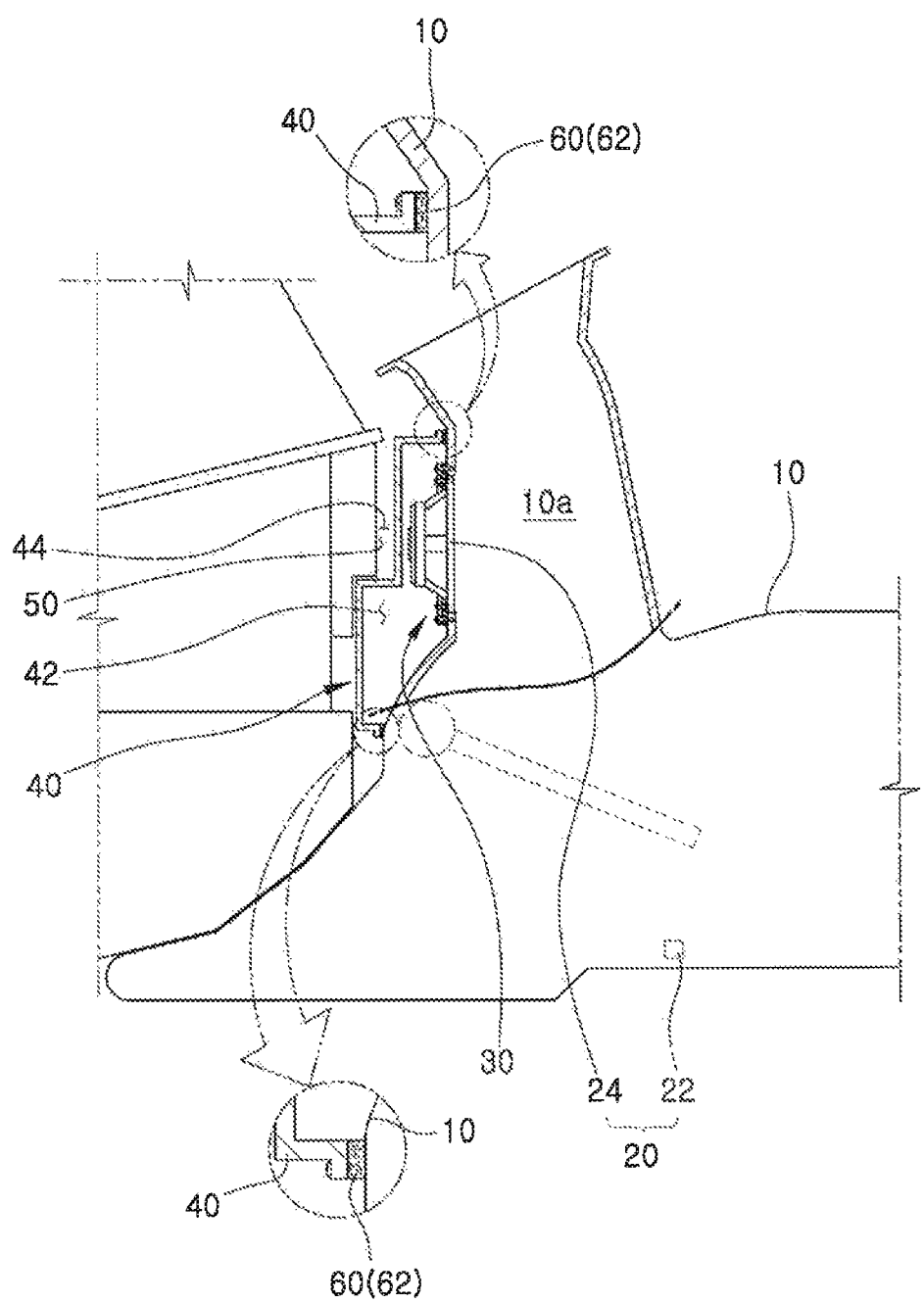
FIG. 14 is a side sectional view of the ANC device of the vehicular air conditioning system shown in FIG. 12.
Figure 15:
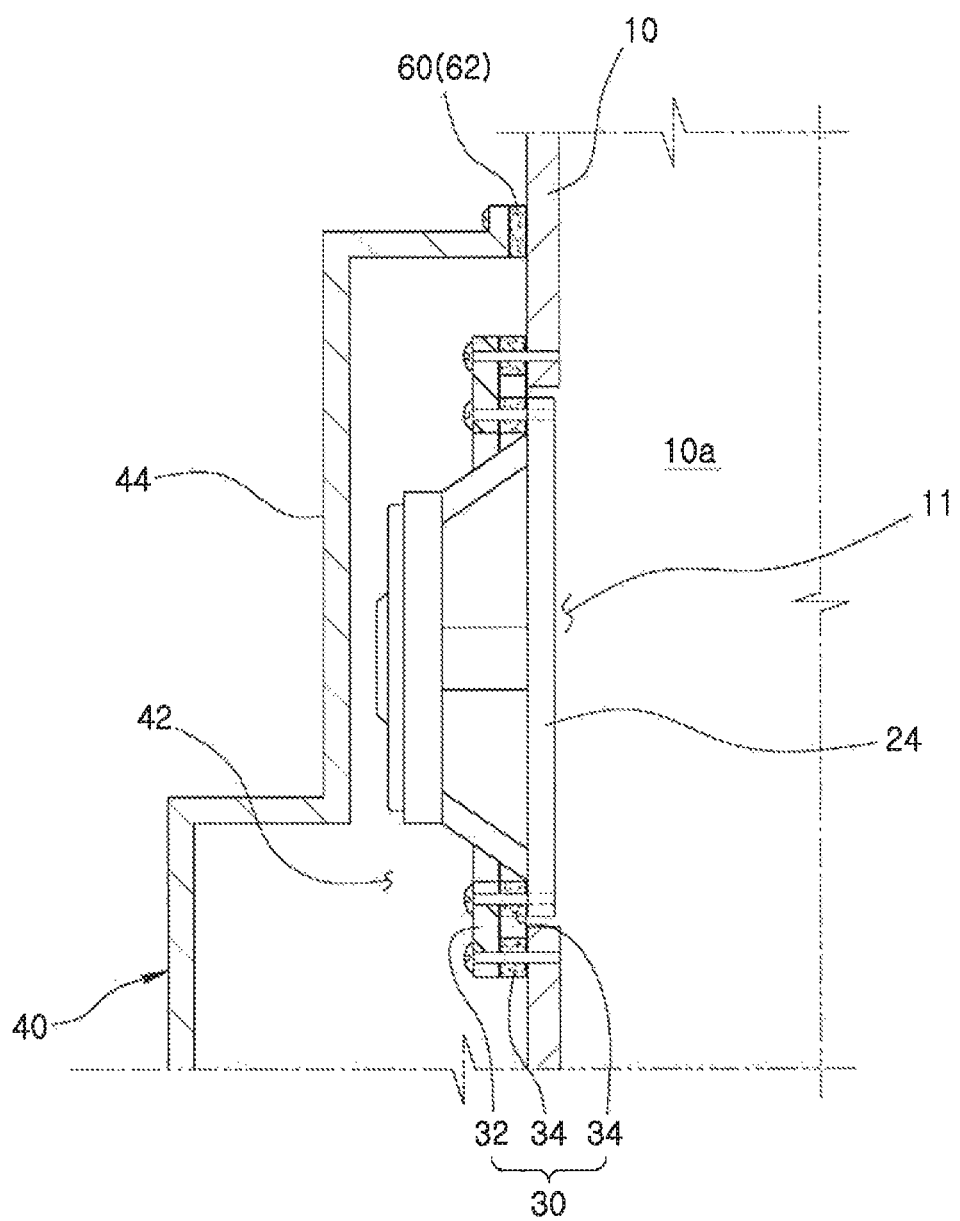
FIG. 15 is a side sectional view specifically showing the ANC device of the vehicular air conditioning system according to the third embodiment the present invention.

As shown in FIGS. 11 and 15, the vibration-proof fixing part 30 includes a fixing bracket 32 fixed to the air conditioner case 10 while supporting the speaker 24, and vibration damping pads 34 provided between the air conditioner case 10 and the fixing bracket 32 and between the fixing bracket 32 and the speaker 24, respectively.

The fixing bracket 32 is made of a metallic material or a synthetic resin and is formed so as to correspond to the edge of the speaker 24.

The fixing bracket 32 is screwed to the edge of the speaker 24 and is screwed to the air conditioner case 10 while supporting the speaker 24. Particularly, the fixing bracket 32 is screwed to the air conditioner case 10 around the through hole 11 of the air conditioner case 10. Therefore, the speaker 24 is fixedly installed in the through hole 11 of the air conditioner case 10.

The vibration damping pads 34 are made of an elastically-deformable material such as rubber or sponge. The vibration damping pads 34 configured as above are installed between the air conditioner case 10 and the fixing bracket 32 and between the fixing bracket 32 and the speaker 24, respectively.

The vibration damping pads 34 are elastically deformable in a state in which they are disposed between the air conditioner case 10 and the fixing bracket 32 and between the fixing bracket 32 and the speaker 24. Thus, the vibration damping pads 34 may absorb and attenuate the vibration generated during the operation of the speaker 24.

Therefore, it is possible to prevent the vibration of the speaker 24 from being transmitted to the air conditioner case 10, thereby preventing the resonance of the air conditioner case 10 due to the vibration of the speaker 24 and the resultant generation of the air conditioner noise.

The vibration damping pads 34 are disposed between the air conditioner case 10 and the fixing bracket 32 and between the fixing bracket 32 and the speaker 24 so as to hermetically seal a gap between the air conditioner case 10 and the fixing bracket 32 and a gap between the fixing bracket 32 and the speaker 24.

Therefore, the air inside the air conditioner case 10 is prevented from leaking to the outside through the gap between the through hole 11 of the air conditioner case 10 and the speaker 24.

Referring again to FIGS. 11 to 15, the vehicular air conditioning system of the present embodiment further includes an enclosure housing 40 provided on the rear side of the speaker 24.

The enclosure housing 40 is made of, for example, a synthetic resin and is configured to isolate the rear portion of the speaker 24 from the surroundings to form a speaker chamber 42 having a sealed structure. The enclosure housing 40 is fixedly installed on the outer surface of the air conditioner case 10.

This enclosure housing 40 prevents cancellation and interference between the front and rear sound waves of the speaker 24 so that high-quality sound waves can be outputted from the speaker 24. Furthermore, the enclosure housing 40 prevents dispersion of the sound waves outputted from the speaker 24, thereby making it possible to precisely control the sound waves.

In addition, by allowing the speaker chamber 42 to serve as a sound box, the sound waves of the speaker 24 are amplified so as to enhance the low-tone characteristics.

The enclosure housing 40 has at least one interference avoiding groove portion 44 on the outer surface thereof.

The interference avoiding groove portion 44 is depressed in a shape corresponding to the shape of various components 50 provided on the outer surface of the air conditioner case 10 and in the surrounding portions thereof.

The interference avoiding groove portion 44 is depressed in conformity with the shape of the peripheral components 50 so as to accommodate various peripheral components 50. Therefore, the interference avoiding groove portion 44 serves to prevent the enclosure housing 40 from interfering with the peripheral components 50.

In particular, by preventing the enclosure housing 40 from interfering with the peripheral components 50, it is possible to install the enclosure housing 40 in a narrow installation space.

As shown in FIGS. 11 to 15, the interference avoiding groove portion 44 is formed in a circular shape, a square shape, a step shape or the like in conformity with the shape of the peripheral components 50.

If the interference avoiding groove portion 44 is formed in a circular shape, a square shape, a step shape or the like, the speaker chamber 42 inside the enclosure housing 40 is formed to have a shape complementary to a shape of the interference avoiding groove portion 44.

Particularly, if the interference avoiding groove portion 44 is formed in a step shape, a step-like protrusion corresponding to the step-like interference avoiding groove portion 44 is formed in the speaker chamber 42 of the enclosure housing 40. Due to the step-like protrusion, the speaker chamber 42 has a multi-step-shaped internal structure.

Meanwhile, the enclosure housing 40 is configured to maintain the height H as low as possible in conformity with the narrow installation space. At this time, the enclosure housing 40 is widely expanded along the outer surface of the air conditioner case 10 in order to compensate the volume reduction of the speaker chamber 42.

The enclosure housing 40 is widely formed so as to correspond to the entirety of one side surface 10-1 of the air conditioner case 10 on which the enclosure housing 40 is installed. The enclosure housing 40 thus formed may provide a speaker chamber 42 having a capacity sufficient to output optimal sound waves even in a narrow installation space.

If the speaker chamber 42 having a desired volume cannot be provided even through the enclosure housing 40 is formed so as to correspond to the entirety of one side surface 10-1 of the air conditioner case 10, the enclosure housing 40 may be expanded along another surface 10-2 adjacent to the one side surface 10-1 of the air conditioner case 10.

Through this expansion of the enclosure housing 40, the speaker chamber 42 of the enclosure housing 40 may be expanded to another surface 10-2 of the air conditioner case 10. For example, the speaker chamber 42 may be expanded so as to correspond to a plurality of outer surfaces of the air conditioner case 10.

As a result, it is possible to provide a speaker chamber 42 having a sufficient size, thereby remarkably improving the sound wave output performance of the speaker 24.

Figure 16:
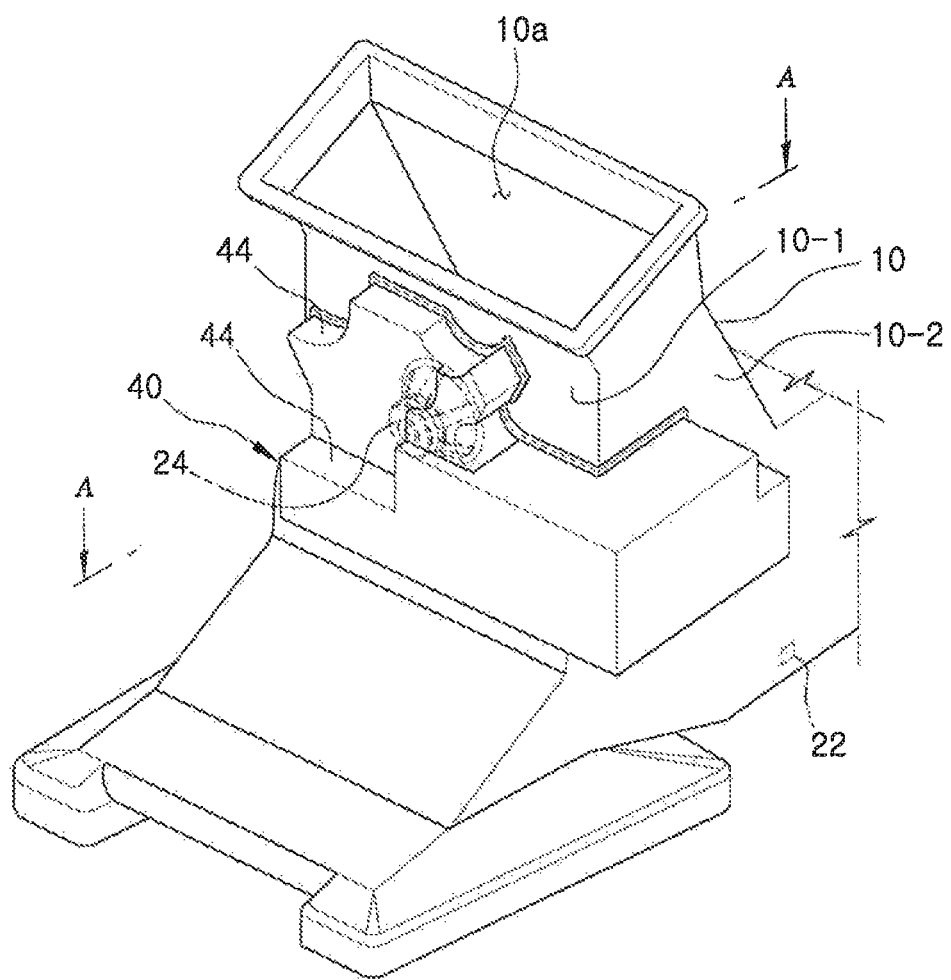
FIG. 16 is a perspective view specifically showing a modified example of the enclosure housing constituting the ANC device of the vehicular air conditioning system according to the third embodiment of the present invention.
Figure 17:
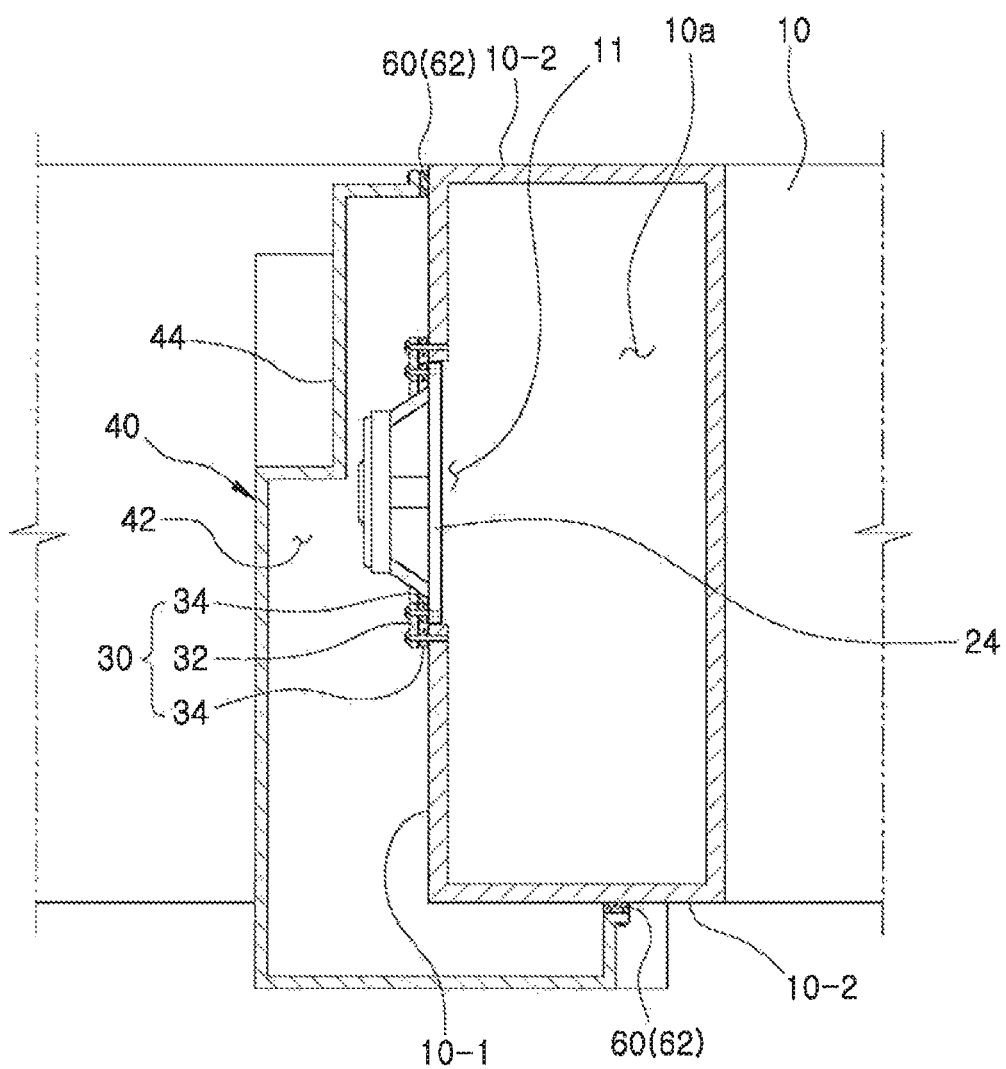
FIG. 17 is a sectional view taken along line A-A in FIG. 16, specifically showing a further modified example of the enclosure housing constituting the ANC device of the vehicular air conditioning system according to the third embodiment of the present invention.

In FIGS. 16 and 17, the enclosure housing 40 is shown to extend from one side surface 10-1 of the air conditioner case 10 to the adjacent another surface 10-2. However, in some cases, the enclosure housing 40 may extend from one side surface 10-1 of the air conditioner case 10 to both side surfaces 10-2 of the air conditioner case 10.

Referring again to FIGS. 11 to 15, the vehicular air conditioning system of the present embodiment further includes an insulating part 60 for hermetically sealing and insulating a portion between the enclosure housing 40 and the air conditioner case 10.

The insulating part 60 includes an insulating pad 62 made of rubber or sponge and provided between the enclosure housing 40 and the air conditioner case 10.

The insulating part 60 enhances the sealing performance of the speaker chamber 42 by keeping the airtightness between the enclosure housing 40 and the air conditioner case 10. This makes it possible to improve the sound wave output performance of the speaker 24.

By insulating the enclosure housing 40 from the air conditioner case 10, the vibration of the speaker 24 transmitted to the enclosure housing 40 is prevented from being transmitted back to the air conditioner case 10.

Therefore, it is possible to prevent the resonance of the air conditioner case 10 due to the vibration of the speaker 24 and the resultant generation of the air conditioner noise.

Figure 18:
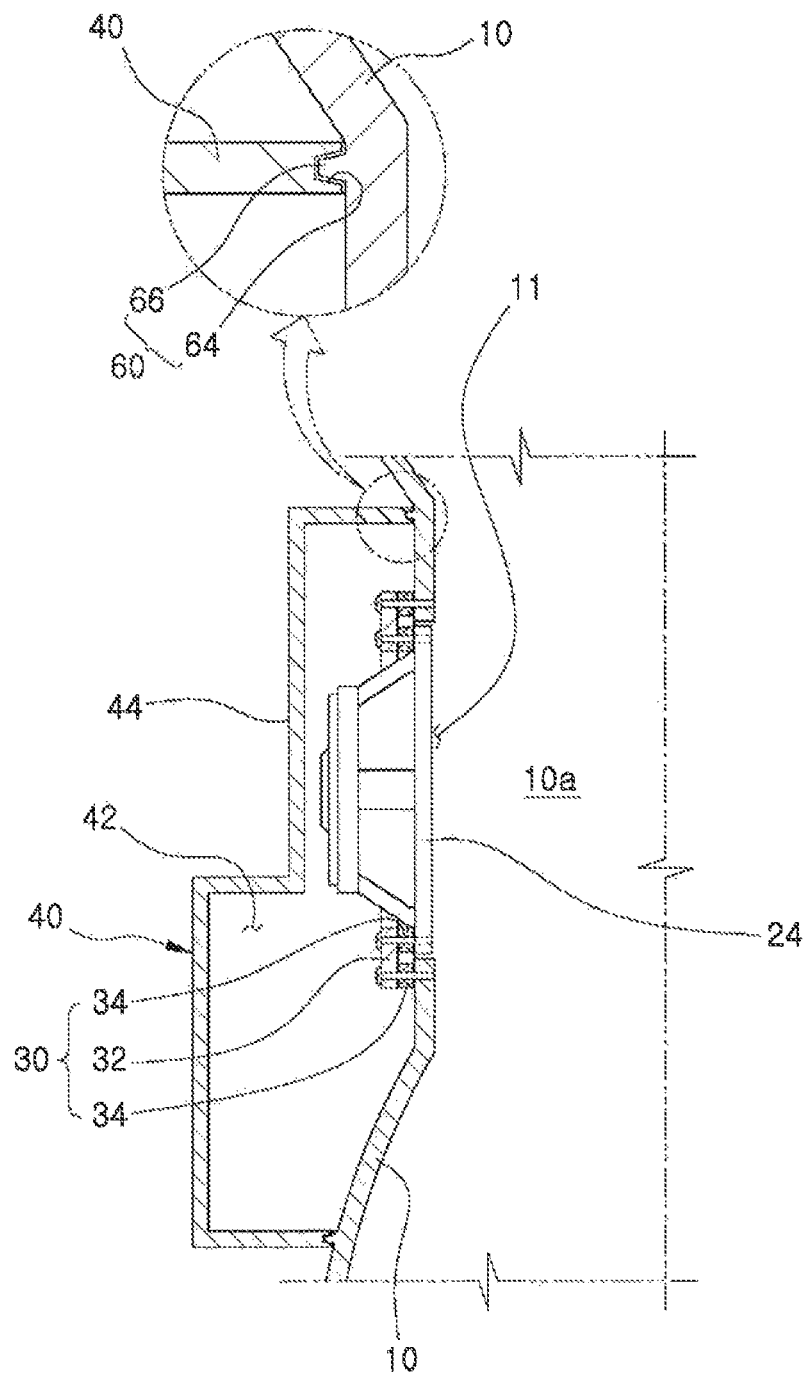
FIG. 18 is a sectional view specifically showing in detail a modified example of a hermetic sealing portion of an enclosure housing constituting the ANC device of the vehicular air conditioning system according to the third embodiment of the present invention.

As shown in FIG. 18, the insulating part 60 may be composed of a groove 64 and a protrusion 66 formed between the enclosure housing 40 and the air conditioner case 10.

Specifically, the insulating part 60 may include a groove 64 formed at the end of the enclosure housing 40 and a protrusion 66 formed in the air conditioner case 10 so as to correspond to the groove 64.

The groove 64 and the protrusion 66 are coupled to each other in the process of assembling the enclosure housing 40 to the air conditioner case 10. The groove 64 and the protrusion 66 thus coupled maintains the airtightness between the enclosure housing 40 and the air conditioner case 10.

Accordingly, it is possible to enhance the sealing performance of the speaker chamber 42, thereby improving the sound wave output performance of the speaker 24.

According to the vehicular air conditioning system of the third embodiment having such a configuration, the enclosure housing 40 is provided on the rear side of the speaker 24 of the noise reduction device 20. The interference avoiding groove portion 44 is formed in the enclosure housing 40 to avoid interference with the peripheral components. The enclosure housing 40 may be expanded along the outer surface of the air conditioner case 10 while maintaining the height H thereof as low as possible. Therefore, the enclosure housing 40 may be installed even in a narrow space and may provide the speaker chamber 42 having a sufficient volume.

Since the speaker chamber 42 having a sufficient volume can be provided in spite of the narrow installation space, it is possible to obtain sound waves having a sufficient output necessary for attenuating the air conditioner noise, thereby improving the attenuation performance of the air conditioner noise.

Since the vibration-proof fixing part 30 for vibration insulation is provided between the speaker 24 of the noise reducing device 20 and the air conditioner case 10, it is possible to prevent the vibration generated in the sound wave output process from being transmitted to the air conditioner case 10.

Since the vibration generated in the sound wave output process can be prevented from being transmitted to the air conditioner case 10, it is possible to prevent the resonance of the air conditioner case 10 due to the vibration of the speaker 24 and the resultant generation of the air conditioner noise.

While some preferred embodiments of the present invention have been described above, the present invention is not limited to these embodiments. It is to be understood that various modifications may be made without departing from the scope of the invention defined in the claims.

What is claimed is:

1. A vehicular air conditioning system, comprising:
   an air conditioner case;
   a blower configured to blow an air to an internal air flow path of the air conditioner case;
   a microphone provided in the internal air flow path on a downstream side of the blower and configured to detect noise;
   a speaker configured to output sound waves having a phase opposite to a phase of the noise detected by the microphone;
   a cooling heat exchanger configured to cool the air blown into the internal air flow path;
   a heating heat exchanger configured to heat the air blown into the internal air flow path; and
   a plurality of air discharge vents configured to discharge the air passed through the cooling heat exchanger and the heating heat exchanger to a passenger compartment,
   wherein the microphone is installed between the blower and the cooling heat exchanger in the internal air flow path of the air conditioner case, and
   the speaker is installed at a front end of each of the air discharge vents in the internal air flow path of the air conditioner case to output noise-attenuating sound waves to the air discharged into the passenger compartment from each of the air discharge vents.

2. The vehicular air conditioning system of claim 1, wherein the microphone and the speaker are installed in a section of the internal air flow path where an air flow is linear.

3. The vehicular air conditioning system of claim 2, wherein the microphone and the speaker are installed on the same line along an air flow direction.

4. The vehicular air conditioning system of claim 3, wherein the microphone is installed on an upstream side of the speaker in the internal air flow path.

5. The vehicular air conditioning system of claim 1, wherein the microphone is installed on a side of an air discharge vent in the air conditioner case to detect noise on the side of the air discharge vent, and
   the speaker is configured to output sound waves having a phase opposite to a phase of the noise detected by the microphone on the side of the air discharge vent.

6. The vehicular air conditioning system of claim 1, wherein the speaker is installed at a front end of each of the air discharge vents and in an air mixing region where the air passed through the cooling heat exchanger and the air passed through the heating heat exchanger are merged.

7. The vehicular air conditioning system of claim 1, wherein the speaker includes a plurality of speakers respectively installed in the internal air flow path at positions corresponding to the air discharge vents.

8. The vehicular air conditioning system of claim 6, wherein the speaker includes a pair of speakers installed on both side walls of the internal air flow path to face the internal air flow path.

9. The vehicular air conditioning system of claim 8, wherein the speakers are installed on both sides of the internal air flow path to face each other along the same central axis.

10. The vehicular air conditioning system of claim 8, wherein the speakers are installed on both sides of the internal air flow path so as to have different central axes.

11. The vehicular air conditioning system of claim 10, wherein the speakers having different central axes are configured to output sound waves having different waveforms.

12. The vehicular air conditioning system of claim 8, wherein the speakers are provided on both sides of the internal air flow path, one of the speakers is installed in a driver's seat side internal air flow path, and the other of the speakers is installed in a passenger's seat side internal air flow path.

13. The vehicular air conditioning system of claim 6, further comprising:
a central separation wall configured to divide the internal air flow path of the air conditioner case into a driver's seat side internal air flow path and a passenger's seat side internal air flow path,
wherein the speaker includes two speakers respectively installed in the driver's seat side internal air flow path and the passenger's seat side internal air flow path.

14. The vehicular air conditioning system of claim 13, wherein the speakers installed in the driver's seat side internal air flow path and the passenger's seat side internal air flow path are installed to have the same central axis and to face each other across the central separation wall.

15. The vehicular air conditioning system of claim 13, wherein the speakers installed in the driver's seat side internal air flow path and the passenger's seat side internal air flow path are installed to have different central axes and to face the central separation wall.

16. The vehicular air conditioning system of claim 15, wherein the speakers having different central axes are configured to output sound waves having different waveforms.

17. The vehicular air conditioning system of claim 1, wherein the microphone includes two microphones installed at an interval between the blower and the cooling heat exchanger.

18. A vehicular air conditioning system, comprising:
an air conditioner case;
a blower configured to blow an air to an internal air flow path of the air conditioner case;
a microphone provided in the internal air flow path on a downstream side of the blower and configured to detect noise; and
a speaker configured to output sound waves having a phase opposite to a phase of the noise detected by the microphone;
and wherein a through hole for installing the speaker is formed on an outer surface of the air conditioner case, and further comprising:
a vibration-proof fixing part configured to fixedly install the speaker in the through hole of the air conditioner case and to prevent vibration of the speaker from being transmitted to the air conditioner case, and
an enclosure housing configured to isolate a rear portion of the speaker from surroundings so that a speaker chamber having a closed structure is formed on a rear side of the speaker,
and wherein the enclosure housing is fixed to one side surface of the air conditioner case and is formed to have a width corresponding to the entirety of one side surface of the air conditioner case.

19. The vehicular air conditioning system of claim 18, wherein vibration-proof fixing part includes a fixing bracket fixed to the air conditioner case while supporting the speaker, and vibration damping pads provided between the air conditioner case and the fixing bracket and between the fixing bracket and the speaker, the vibration damping pads configured to absorb and attenuate the vibration of the speaker transmitted from the speaker to the air conditioner case.

20. A vehicular air conditioning system, comprising:
an air conditioner case;
a blower configured to blow an air to an internal air flow path of the air conditioner case;
a microphone provided in the internal air flow path on a downstream side of the blower and configured to detect noise; and
a speaker configured to output sound waves having a phase opposite to a phase of the noise detected by the microphone;
and wherein a through hole for installing the speaker is formed on an outer surface of the air conditioner case, and further comprising:
a vibration-proof fixing part configured to fixedly install the speaker in the through hole of the air conditioner case and to prevent vibration of the speaker from being transmitted to the air conditioner case, and
an enclosure housing configured to isolate a rear portion of the speaker from surroundings so that a speaker chamber having a closed structure is formed on a rear side of the speaker, and
wherein the enclosure housing is formed to extend to another surface adjacent to one side surface of the air conditioner case, and the speaker chamber inside the enclosure housing is formed to correspond to a plurality of outer surfaces of the air conditioner case.

21. The vehicular air conditioning system of claim 20, wherein the speaker chamber inside the enclosure housing is formed to have a shape complementary to a shape of the interference avoiding groove portion.

22. The vehicular air conditioning system of claim 21, wherein the interference avoiding groove portion is formed in a multi-step shape on an outer surface of the enclosure housing, and the speaker chamber of the enclosure housing has a multi-step-shaped internal structure corresponding to the interference avoiding groove portion.

23. The vehicular air conditioning system of claim 20, further comprising:
an insulating part configured to hermetically seal and insulate a portion between the enclosure housing and the air conditioner case.

* * * * *